United States Patent
Pham et al.

(10) Patent No.: US 11,068,514 B2
(45) Date of Patent: Jul. 20, 2021

(54) SYSTEM AND METHOD FOR INDEXING SPATIAL DATA IN A COMPUTER NETWORK USING THE LEAST DIFFERENTIAL SUM AND BINARY DECISION TREE

(71) Applicants: Vu Tran Pham, Ho Chi Minh (VN); Hai Duc Nguyen, Ho Chi Minh (VN)

(72) Inventors: Vu Tran Pham, Ho Chi Minh (VN); Hai Duc Nguyen, Ho Chi Minh (VN)

(73) Assignee: VIET NAM NATIONAL UNIVERSITY HO CHI MINH CITY, Thu Duc (VN)

( * ) Notice: Subject to any disclaimer, the term of this patent is extended or adjusted under 35 U.S.C. 154(b) by 0 days.

(21) Appl. No.: 16/143,406

(22) Filed: Sep. 26, 2018

(65) Prior Publication Data

US 2021/0056126 A1    Feb. 25, 2021

(51) Int. Cl.
| | | |
|---|---|---|
| G06F 16/29 | (2019.01) | |
| G06N 5/00 | (2006.01) | |
| G06F 17/18 | (2006.01) | |
| G06F 17/16 | (2006.01) | |
| G06F 16/2455 | (2019.01) | |

(52) U.S. Cl.
CPC ........ *G06F 16/29* (2019.01); *G06F 16/24556* (2019.01); *G06F 17/16* (2013.01); *G06F 17/18* (2013.01); *G06N 5/003* (2013.01)

(58) Field of Classification Search
CPC .................. G06F 16/29; G06F 17/18
See application file for complete search history.

(56) References Cited

U.S. PATENT DOCUMENTS

| | | | | |
|---|---|---|---|---|
| 2008/0260006 A1* | 10/2008 | Luo | ...................... | H04L 27/0014 375/148 |
| 2019/0185864 A1* | 6/2019 | Simons | .............. | A01K 67/0276 |

\* cited by examiner

*Primary Examiner* — Baoquoc N To

(57) ABSTRACT

A method and a computer software for managing a database of a computer network are disclosed which comprises: selecting a data sample, dividing the data sample into an N×M matrix having equal cells, grouping adjacent cells into a plurality of memory blocs by a least differential sum method, constructing a decision tree based on the partitions of the memory blocs, labeling each of the memory blocs based on the decision tree; storing and retrieving data points into the memory blocs; and linking the memory blocs together by a set of resolution nets.

20 Claims, 9 Drawing Sheets

SYSTEM AND METHOD FOR INDEXING SPATIAL DATA IN A COMPUTER NETWORK USING THE LEAST DIFFERENTIAL SUM AND BINARY DECISION TREE

FIELD OF THE INVENTION

The present invention relates generally to the field of data processing. More specifically, the present invention relates to indexing methods in database management system (DBMS).

BACKGROUND ART

Indexing for spatial or geographical data plays an important role in database management systems (DBMS). Indexing is a structure that exists independent of the main data. It is similar to an index table in the back of a text book. The purpose of indexing is to optimize the ability of searching, retrieving, and entering data. Thus, indexing helps improving the database performance. With the support of index structures, in response to a data request, database administrators only need to look into a small portion of the relevant data instead of scanning the entire database. It is analogous to searching for a word in its alphabetical group, find the word and all relevant pages where that word occurs. Thus, indexing saves time and costs for searching, reading data, and entering data. In addition, a good indexing structure optimizes memory spaces and achieves low latency and scalability in data manipulation such as addition, deletion, and modification.

In computer networking, often the data set is too large, it cannot be stored on a single computer. The large data set needs to be stored in a data center comprising many databases. In this distributed environment, the indexing methods usually used are R-Tree, Quad-Tree, k-d Tree, and even dividing net. R-Tree and its variants including R*-Tree, R+-Tree split the data space into possibly overlapping small rectangles called minimum bounding region (MBR). These rectangles are grouped into larger rectangles which contain all smaller rectangles or children rectangles. Large rectangles continue to be grouped until they form the largest rectangle, covering all the children rectangles. The relationship between the rectangles is transformed into the R-Tree. When retrieving data, the database management system (DBMS) will browse each node in the tree, starting with the root node representing the largest rectangle that spans the entire space. After each browsing step, the search space will be narrowed down until the rectangle containing the relevant data at the leaf node of the tree is located. In situation where the relevant rectangle is not found, the DBMS returns a "not found" message. The advantage of the R-Tree is that it is a balanced tree so the search process is fast and not affected by the distribution of data. However, in the process of adding data, the R-Tree needs to do a lot of extra work. This makes R-Tree inefficient in network databases that frequently update the data set.

Quad-Tree manages data in a given rectangular space represented by a root node. Each node in the Quad-Tree has a certain capacity and is equal. When the number of data entered into the node exceeds this threshold, the node will automatically split into four other children nodes: four rectangles formed by separating the old nodes in both horizontal and vertical directions. The data is then redistributed to the children nodes. The Quad-Tree has relatively short data duration as it does not have to rebalance its structure. However, because of this, Quad-Tree retrieves data slowly, especially with deviated data sets which are distributed almost randomly.

K-d Tree manages data on a given rectangular space. Each node on the k-d tree has the same capacity and this capacity is the same for all nodes. When the amount of data in the node exceeds this threshold, the node is split into two nodes. Two children nodes are measured by the pitch or center of gravity of the point in the median along either vertical or horizontal direction, depending on which node divides the node. Similar to quad-tree, k-d tree does not take much time to add data, but data access is very slow in deviated data sets.

Mesh is a method of dividing the rectangular shape of the storage space into equal squares or rectangles. This method allows new data to be added very fast but slower data retrieval in case of deviated data sets.

Therefore, what is needed is an indexing method and system in a computer network that is easy to design and efficient in data management.

Furthermore, what is needed is an indexing method and DBMS system that can access deviated distribution of data set in a minimal time.

Yet, what is needed is an indexing method and a DBMS that has a variety of resolution nets so that data can be efficiently stored in either dense or sparse data centers.

The present invention provides solutions to the above needs.

SUMMARY OF THE INVENTION

Accordingly, an objective of the present invention is to provide a method for managing a database of a computer network which comprises: selecting a data sample, dividing the data sample into an N×M matrix having equal cells, grouping adjacent cells of the N×M matrix into a plurality of memory blocs by a least differential sum (LDS) method, constructing a decision tree based on the partitions of the memory blocs, labeling each of the memory blocs based on the decision tree, storing and retrieving data points into the memory blocs, and linking the memory blocs together by a set of resolution nets.

Another objective of the present invention is to provide an indexing method on the distribution of data to split the memory space into separate partitions with similar data volumes to easily distribute data on multiple computers. In each data area, data points are managed by multiple layers to shorten the process of adding and reading data.

Yet another objective of the present invention is to provide a computer software program for managing a database of a computer network which comprises: selecting a data sample, dividing the data sample into an N×M matrix having equal cells, grouping adjacent cells into a plurality of memory blocs by a least differential sum method, constructing a decision tree based on the partitions of the memory blocs, labeling each of the memory blocs based on the decision tree, storing and retrieving data points into the memory blocs, and linking the memory blocs together by a set of resolution nets.

Yet another objective of the present invention is to provide a computer network which comprises: a plurality of computing devices each comprising a non-transitory data storage, a microprocessor, an input/output system, and a display unit; a network operable to facilitate the communication between the plurality of computing devices, and the network is operable to link the non-transitory data storages together into an aggregate spatial data space; a data management system for managing the aggregate spatial data space. The computer network further includes a microprocessor operable to execute computer program instructions, and a memory operable to store the computer program instructions executable by the microprocessor for performing the steps of: sampling an aggregate data space into a data sample including a plurality of data points, covering the plurality of data points with an N×M matrix so that each cell of the N×M matrix has an equal area, grouping the cells into a plurality of memory blocs using a least differential sum method, constructing a binary decision tree based on the memory blocs, labeling each memory bloc by means of the binary decision tree, managing the plurality of data points from the memory blocs, and linking the memory blocs together by a set of resolution nets.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 3(A)-FIG. 3(F) are diagrams illustrating the remaining steps and the binary decision tree of the least differential sum indexing (LDS) method in accordance with an embodiment of the present invention;

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
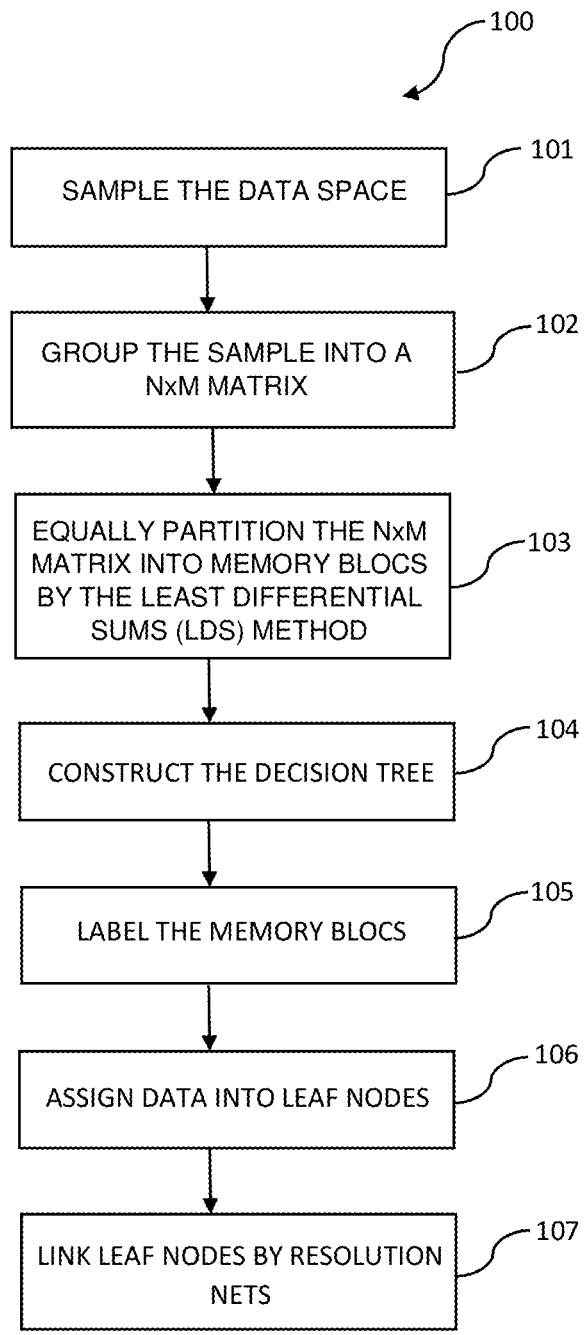
FIG. 1 is a flowchart of a least differential sum (LDS) indexing method for managing a data space in accordance with an exemplary embodiment of the present invention.

Many aspects of the present invention are now described with reference to FIG. 1-FIG. 6. FIG. 1 illustrates a flowchart of the least differential sum (LDS) indexing method 100 for managing a data space in accordance with an embodiment of the present invention.

Method 100 begins at step 101 where data space is first sampled. In many aspects of the present invention, data space is defined as the collection of data points in the memories of a single computer or many different computers connected together via a network such as cloud, internet, wide area network (WAN), or local area network (LAN), or personal area network (PAN), etc. In one exemplary embodiment, data space can be optical memory such as CD, DVD, HD-DVD, Blue-Ray Discs, etc.; semiconductor memory such as RAM, EPROM, EEPROM, etc.; and/or magnetic memory such as hard-disk drive, floppy-disk drive, tape drive, MRAM, etc. In another exemplary embodiment, data space can be a network attached storage (NAS) which is a mass storage attached to a computer in a network from which other computers can access at file level. Within the scope of the present invention, the term "sampling" means grouping and/or taking samples of data points from a data space defined above.

Next at step 102, the data sample is grouped or enclosed by an N×M matrix, wherein N, M are non-zero positive integers ($I^+$). In one exemplary embodiment, the N×M matrix has N×M cells of equal area. It is noted that the denser the distribution of the data space (or smaller the standard deviation), the narrower the cell of the N×M matrix. On the contrary, the more the data space is widely distributed or deviated (the larger the standard deviation), the wider the area of the cells.

At step 103, the N×M matrix is partitioned into memory blocs by the least differential sum (LDS) scheme of the present invention. That is, the N×M matrix is partitioned along either the horizontal lines or vertical lines in the following manner: (1) The sums of the number of data points within either a column or a row are taken; (2) the difference between the sums of two adjacent rows or columns is taken; (3) along which direction the N×M matrix is partitioned depends on which direction the difference is smaller. That is, the partition obeys the following formula:

$$\text{Min.}\left(\min_{i=1}^{N-2}\left|\sum_{j=0}^{M-1}\left(\sum_{k=0}^{i}C_{k,j}-\sum_{k=i+1}^{N-1}C_{k,j}\right)\right|,\right. \quad \text{(Equation 1)}$$

$$\left.\min_{j=1}^{M-2}\left|\sum_{i=0}^{N-1}\left(\sum_{k=0}^{j}C_{i,k}-\sum_{k=j+1}^{M-1}C_{i,k}\right)\right|\right)$$

wherein $C_{k,j}$ is contents of either columns and rows of the N×M matrix; according to Equation 1, every adjacent rows and columns are summed up, their differentials are taken, and the minimum among those differentials are selected. The least among those minima is finally selected as the final partitioning line. If the N×M matrix is a 4×4 matrix, there are 3 different ways to divide the rows and 3 different ways to divide the columns. If each row and column address starts at 0, there are N−2 and M−2 different ways of dividing the N×M matrix.

In one exemplary embodiment, in case of equipartition, when N=M=even positive integer number (N=M ∈ 2I⁺), N×M matrix is equipartitioned (always divided into two equal halves), the formula is much simpler and Equation 1 becomes:

$$\text{Min.}\left\{\left|\sum_{j=1}^{M} C_{i,j} - \sum_{j=1}^{M} C_{i+1,j}\right|, \left|\sum_{l=1}^{N} R_{k,l} - \sum_{l=1}^{N} R_{k+1,l}\right|\right\}, \quad \text{(Equation 2)}$$

where $C_{i,j}$ is the content of the $C_{i,j}$ column of the N×M matrix and $C_{i+1,j}$ is the content of the adjacent column; similarly, $R_{k,l}$ is the content of the $R_{k,l}$ row and $R_{k+1,l}$ is the content of the adjacent row. With equipartitioning embodiment, the number of dividing steps reduced significantly. The partitioning process continues in accordance with the least differential sum (LDS) until the N×M matrix cannot be partitioned further. Please refer to FIG. 3 for more illustrations of the least differential sum method.

At step 104, a decision tree is constructed based on the partitioning results of step 103. More particularly, the root node represents the entire sample data (or the entire data points enclosed inside the N×M matrix). The first-generation children nodes represent the first partition results. The grand-children nodes represent the subsequent partition results. The leaf nodes represent the final partition results. In one exemplary embodiment of the present invention, the decision tree is a binary decision tree. That is, the left-hand side children nodes always get a 0 and the right-hand side children nodes always get a "1". Finally, leaf nodes are linked together to form a single linked list, starting from the leftmost leaf node and ending at the rightmost leaf node.

Next is step 105, after the partition is completed and the decision tree is constructed, memory blocs are labeled using the decision tree. In the binary embodiment, every generation on the left-hand side gets a "0" and that on the right-hand side gets a "1" until leaf nodes are reached.

At step 106, data points are assigned to leaf nodes. In corollary, from the memory blocs, the computer system knows the binary address based on the binary tree.

Finally, at step 107, leaf nodes and memory blocs are linked together by resolution nets. Resolution nets are a set of matrices of different resolutions (or sizes): the smaller the matrix size the higher the resolution. This way, all the cousin leaf nodes are linked by these resolution trees. Each resolution net contain a different address of a data point. For example, when data points are dispersed (deviated) in a memory bloc corresponding to a leaf node, the low-resolution net can be used. On the other hand, when data points are dense, the high-resolution net is used.

In reference to FIG. 2(A)-FIG. 2(F), various illustrating examples of a database management algorithm using least differential sum indexing (LDS) method 100 above are presented and discussed in details as follows.

Figure 2A:
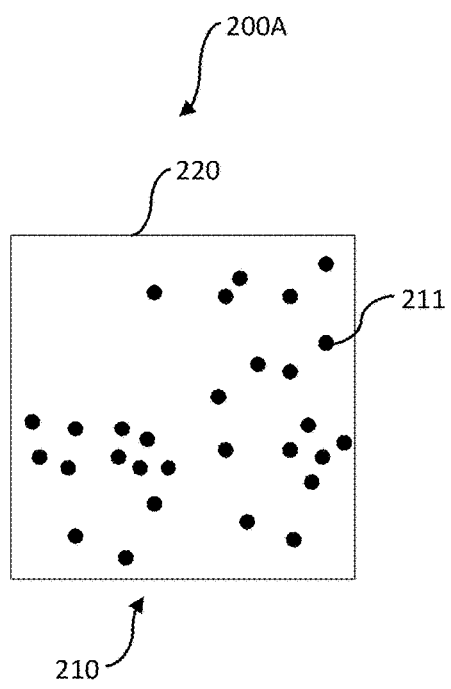
FIG. 2(A) is a diagram illustrating the first step of the least differential sum indexing (LDS) method in accordance with an exemplary embodiment of the present invention.
Figure 2B:
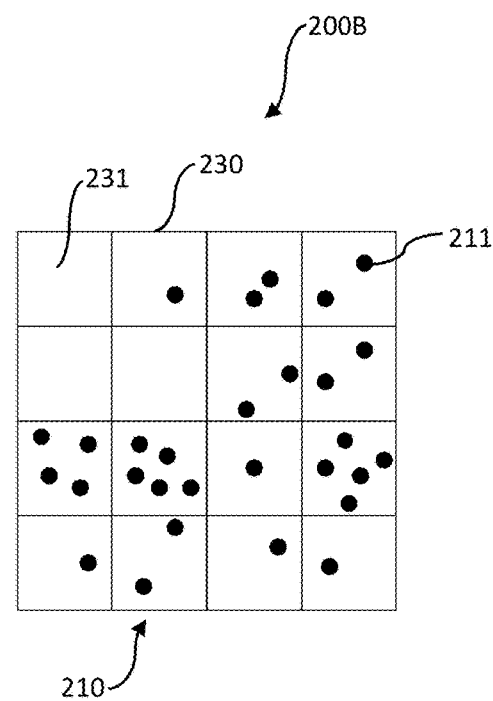
FIG. 2(B) is a diagram illustrating the second step of the least differential sum indexing (LDS) method in accordance with an exemplary embodiment of the present invention.

Now referring to FIG. 2(A)-FIG. 2(B), diagrams 200A and 200B illustrating the first two steps 101 and 102 of least differential sum (LDS) indexing method 100 in accordance with an exemplary embodiment of the present invention are presented. In FIG. 2(A), a data space 210 including many data points 211 is sampled, collected, or grouped in a boundary 220. As alluded in step 101 above, data space 210 can be sampled from a single hard drive or from a network attached storage (NAS) or distributed databases. FIG. 2(B) illustrates the implementation of step 103. The data sample is partitioned into an N×M matrix 230 with equal-area cells 231, where N and M are non-zero positive integers (I⁺). As alluded above, the more data points 211 are geographically disperse (or deviated), the larger the area of cell 231.

Figure 3A:
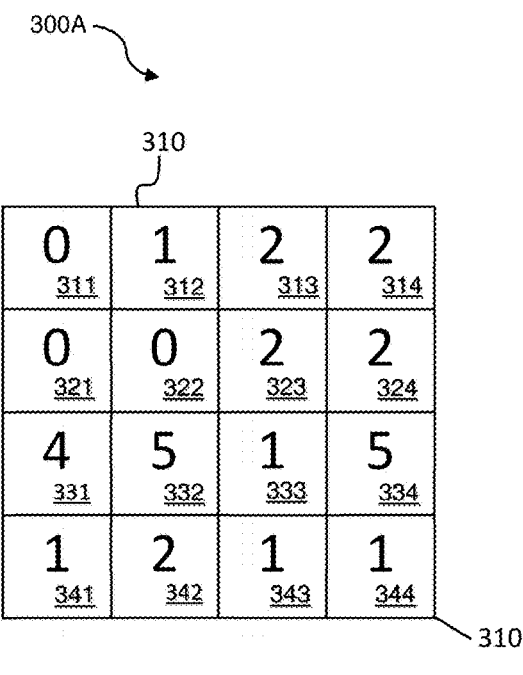

Next referring to FIG. 3(A)-FIG. 3(F), diagrams 300A-300F illustrating respective steps 104-107 of method 100 are shown. In FIG. 3(A), a diagram 300A illustrates the summing process of the present disclosure: data points 211 in each cell 231 are added up. Please refer back to FIG. 2, as an example, first cell 231 having a matrix address 311 (from heretofore cell having matrix address 311 is identified as "cell 311") has zero data point. Thus, the total number of data points 211 in cell 311 is zero. A cell 312, in the first row of the second column has one data. The total number of data points 211 in cell 312 is therefore 1. Similarly, the total number of data points 211 of a cell 313 in the first row of the third column is 2. The total number of data points 211 of a cell 314 in the first row of the fourth column is also 2. The total number of data points 211 of a cell 321 in a second row of a first column is also 0. The total number of data points 211 of a cell 322 in the second row of the-second column is also 0. The total number of data points 211 of a cell 323 in the second row of the third column is 2. The total number of data points 211 of a cell 324 in the second row of the fourth column is also 2. Next, pointing to the third row of N×M matrix 310, the total number of data points 211 of a cell 331 in the third row of the first column is 4. The total number of data points 211 of a cell 332 in the third row of the second column is 5. The total number of data points 211 of a cell 333 in the third row of a third column is 1. The total number of data points 211 of a cell 334 in the third row of the fourth column is 5. Next, moving to the fourth row, the total number of data points 211 of a cell 334 in the fourth row of the first column is 1. The total number of data points 211 of a cell 342 in the fourth row of the second column is 2. The total number of data points 211 of a cell 343 in the fourth row of the third column is 1. Finally, the total number of data points 211 of a cell 344 in the fourth row of the fourth column cell 344 is 1. Thus, from the total number of data points 211 in each cell 231 of N×M matrix 310, the spatial distribution of data points 211 can be determined. The third row has a very low standard deviation of data distribution: from the first column to the fourth column of the third row, the distribution of data points can be observed as follows: 4, 5, 1, and 5 respectively.

Figure 3B:
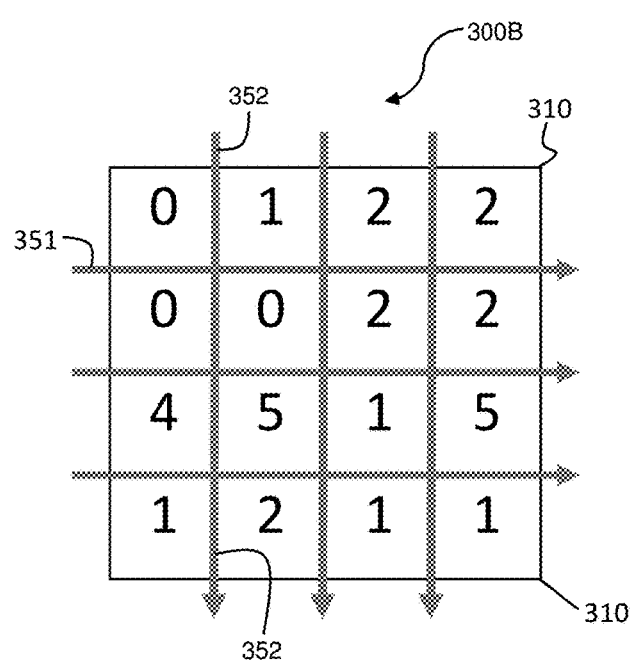

Referring again to FIG. 3(B), a diagram 300B illustrates the division method of the present disclosure as follows: in the regular partitioning embodiment, there are 3 (4-1) different ways to divide N×M matrix 310 in the row direction and 3 different ways to divide them in the column direction (N, M=4). In accordance to Equation 1, the first sums in the row direction from top to bottom are 5, 4, 15, and 5 respectively. If row 1 line (bottom line) is used as a partitioning line, the differential is: 24−5=19. If row 2 line is used as the partitioning line, the differential is: 20−9=11. If row 3 line is used as the partitioning line, the differential is: 24−5=19. Therefore, the least differential in the row direction is 11. Accordingly, the middle row is selected as the partitioning line in the row directions. Now, in the column direction, the sums in the column direction from left to right are 5, 8, 6, and 10 respectively. Therefore, if column 1 line (rightmost line) is used as the partitioning line, the differential is: 24−5=19. If column 2 line is used as the partitioning line, the differential is: 16−13=3. And if column 3 line is used as the partitioning line, the differential is: 19−10=9. Thus, the least differential sum (LDS) in the column direction is 3. The column line 2 should be selected as the partitioning line in the column direction. Finally, since 3 is the least differential sum (LDS) in both row and column directions, the column 2 line is selected as the partitioning line as shown in FIG. 3(B).

Figures 3C, 3D:
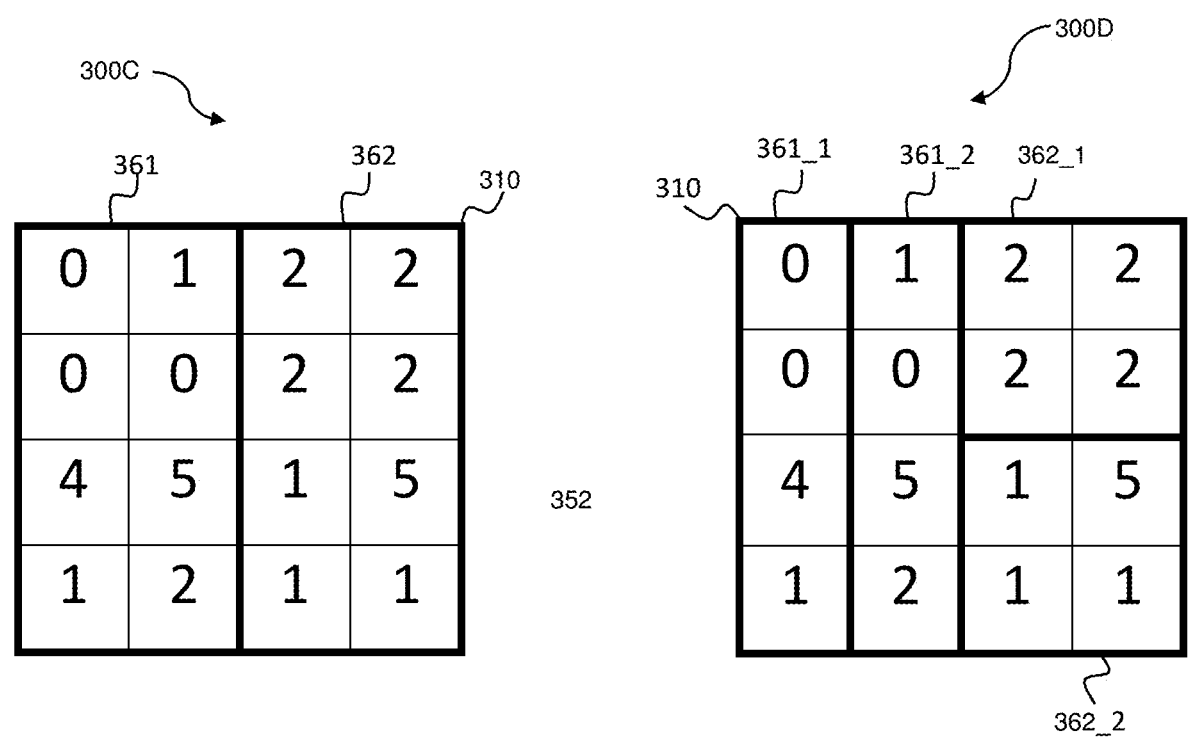

Next, referring to FIG. 3(C), a diagram 300C shows two possible ways of partitioning N×M matrix 310 in accordance with the equipartition embodiment of the present invention. The first partition uses horizontal lines 351 going across the rows of N×M matrix 310. The second partition uses vertical lines 352 going across the columns. Whether the first partition or the second partition is chosen to partition N×M matrix 310 depending on the least differential sums (LDS), please see Equation 2 between two adjacent rows or columns. At first, N×M matrix 310 is divided in half (equipartitioning). If horizontal line 351 is used, the sum of the first horizontal half is 9 and that of second horizontal half is 25. Their differential sum between these two adjacent rows is: 25−5=20. Now if vertical line 352 is used, the sum of first columnar half is 13 and that of the second columnar half is 16. The differential sums between the first columnar half and the second columnar half is 3. Because the differential sum by horizontal lines 351 is highest (20), and that of vertical line 352 is lowest (3), the first partitioning of N×M matrix 310 is performed along vertical line 352 into first columnar (vertical) half 361 and second columnar (vertical) half 362 as shown in diagram 300C of FIG. 3(C).

Next, referring to FIG. 3(D), a diagram 300D illustrates the next partitioning step 103. Again, in the regular or unequal area partitioning embodiment of Equation 1, in first columnar (vertical) half 361, there is one vertical partitioning and 3 horizontal partitioning. The vertical partitioning results in the differential: 8−5=3. The sums of three horizontal partitioning from top to bottom are: 1, 0, 9, and 3 respectively. If row 1 line is selected, then the differential is: 12−1=10. If row 2 line is selected, then the differential is: 12−1=10. If row 3 line is selected, then the differential is: 10−3=7. Thus, for first columnar (vertical) half 361, the vertical division is the minimal. As such, first columnar half is divided into first half 361_1 and 361_2. Next, in second columnar (vertical) half 362, there is one vertical partitioning and 3 horizontal partitioning. If the third column line is selected, the differential is: 10−6=4. The sums of three horizontal partitioning from top to bottom are: 4, 4, 6, and 2 respectively. If row 1 line is selected, then the differential is: 12−4=8. If row 2 line is selected, then the differential is: 8−8=0. If row 3 line is selected, then the differential is: 14−2=12. Thus, for second columnar (vertical) half 362, the horizontal partition using row 2 line is the least differential. As such, second columnar half 362 is divided into first half 362_1 and 362_2.

Referring again to FIG. 3(D), in the equipartitioning of Equation 2, first vertical half 361 is again divided into two equal halves. The horizontal lines 351 and vertical lines 352 partitions as discussed above in FIG. 3(B) are used again. Again, the differential sums between first half along horizontal line 531 is12−1=11. While that of vertical line 532 is 8−5=3. So, the differential sum along vertical line 532 is the least differential sum (LDS). Thus, first vertical half 362 is divided along a vertical line into a first half 361_1 and a second half 361_2. Next, in second half 362, the differential sum between vertical line 352 is 10−6=4; while that horizontal line 351 is 8−8=0, which is the least differential sum. Thus, second half 362 is divided along horizontal line 351 into 362_1 and 362_2.

Figure 3E:
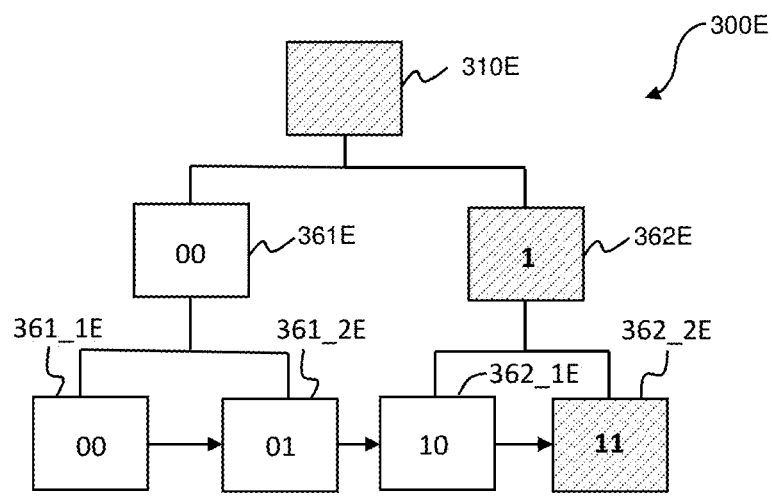

FIG. 3(E) illustrates step 104 of constructing a decision tree 300E. A root node 310E represents the entire data points of N×M matrix 310. First generation children nodes 361E and 362E represent first partitioned halves 361 and 362 respectively. Grand-children nodes 361-1E and 361-2E represent two halves 361_1 and 361_2 respectively. Similarly, grand-children nodes 362-1E and 362-2E represent two halves 362_1 and 362_2. Please note that grand-children nodes 361-1E to 362-2E are leaf nodes. In one exemplary embodiment of the present invention, decision tree 300E is a binary decision tree: in which every left-hand side node is assigned a zero (0) and every right-hand side node is assigned a one (1). As such, node 361 is a left-hand side node which gets a 0. Node 362 is a right-hand side node which gets a 1.

Continuing with FIG. 3(E), next generation children nodes 361-1E and 361-2E get 00 and 01 binary address respectively. Similarly, next generation children nodes 362-1E and 362-2E get 10 and 11 binary addresses respectively. As alluded above, leaf nodes 361-1E to 362-2E are linked together to form a single linked list having the binary addresses ranging from 00 to 11 respectively.

Figure 3F:
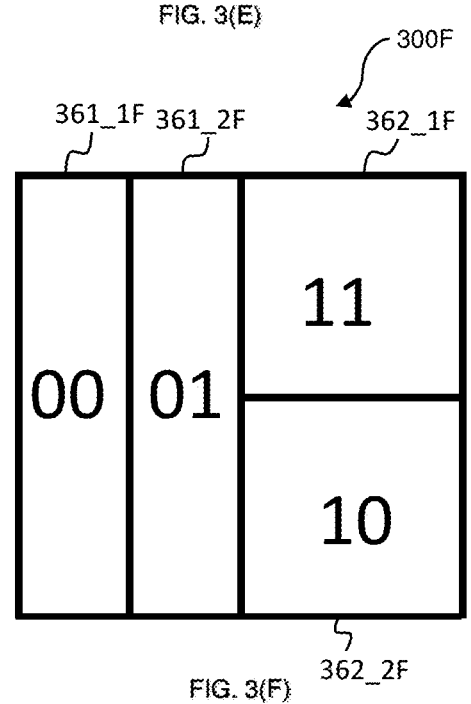

Referring to FIG. 3(F), a diagram 300F illustrates the operation of step 105: a matrix 310F is labeled using decision tree 310E. More particularly, halves 361_1, 361_2, 362_1, and 362_2 are labeled in accordance with binary decision tree 310E. Memory bloc 361_1F having a binary address 00 is assigned to leaf node 361-1E. Memory block 361_2F having a binary address 01 is assigned to leaf node 361-2E. Memory block 362_1F having a binary address 11 is assigned to leaf node 362-1E. Memory block 362_2F having a binary address 10 is assigned to leaf node 362-2E.

Figure 4:
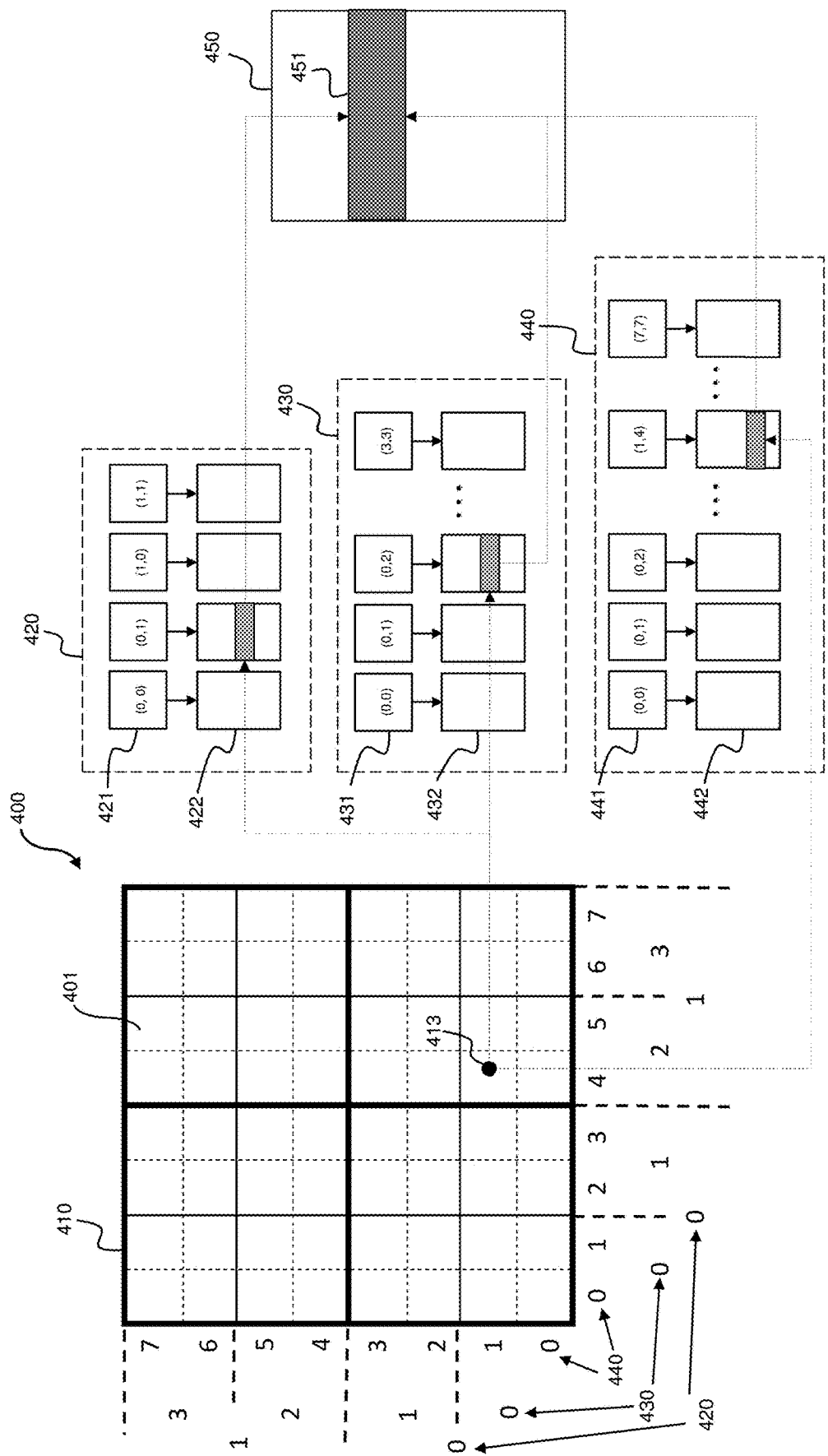
FIG. 4 is a diagram illustrating the resolution nets linking memory spaces at the leaf nodes level in accordance with an exemplary embodiment of the present invention.

Now referring to FIG. 4, a diagram 400 illustrating the resolution nets linking memory spaces at the leaf nodes level in accordance with an exemplary embodiment of the present invention is illustrated. An actual data storage area 450 is at the leaf node of decision tree. Therefore, when a new data point 413 to be added, modified, or removed, the location information of data point 413 will be used to browse the resolution tree to find the leaf node of the limited space surrounding data point 413. Data content of data point 413 will then be updated into this space. For each resolution net: a lowest resolution net 420, a medium resolution net 430, and a highest resolution net 440 can be employed inside a storage space. As such, a pointer to data point 413 is created and stored in storage area 450. More particularly, in one exemplary embodiment of the present invention, lowest resolution net 420 is a largest 2×2 matrix having the addresses ranging from 0-1 in both directions. Thus, within lowest resolution net 420, data point 413 has the address of (0), which is indicated in leaf node 421 of binary decision tree 420. The content of data point 413 is indicated by a shaded area in a storage space 422 under the address (0, 1). Next, medium resolution net 430 is a 4×4 matrix having the addresses ranging from 0-3 in both directions. Thus, within medium resolution net 430, data point 413 has the address of (0, 2), which is indicated in leaf node 431 of binary decision tree 430. The content of data point 413 is represented by the shaded area in a storage space 432 under the address (0, 2). Similarly, highest resolution net 440 is a finest 8×8 matrix having the addresses ranging from 0-7 in both directions. Thus, within highest resolution net 440, data point 413 has the address of (1, 4), which is indicated in leaf node 441 of binary decision tree 440. The content of data point 413 is the shaded area in a storage space 442 under the address (1, 4). It will be appreciated that any numbers K of resolution nets of I by J matrices, where J, K are non-zero positive integers ($I^+$), are within the scope of the present invention.

Referring again to FIG. 4, from the above non-limiting example, any data point 451 of a data storage 450 can have K different resolution nets and K addresses corresponding to various sizes of I×J resolution matrices. Depending on the distribution of data points 451 in the data set, a suitable resolution net is used to quickly locate and modify that data point, thus saving time, improving latency, and reducing errors. In many aspects of the present invention described in FIG. 4, resolution nets are similar to adding pages, lines, and columns addresses to a word in a book. If words in a page are thinly distributed (i.e., summary of a chapter), then line and column addresses of a word are not needed. Only page address of that word is necessary. On the other hand, if words are located in different pages and on a densely distributed page, then pages, lines, and column addresses are helpful in locating, adding, modifying, and deleting those words. For example, the words, "data" has page addresses as 5, 15, and 100; lines addresses 2, 29 on page 5; 3, 18, 27 on page 15; and 4, 5, 6, 7 on page 100. Column addresses include 2, 20 on line 2, page 5, etc. Then this word can be rather quickly located on page 5, line 2 starting from the top, and columns 2 and 20 starting from beginning of the sentence. Thus, various aspects of the present invention as described in FIG. 4 achieve the objectives of saving time, improving latency, and reducing errors.

Figure 5:
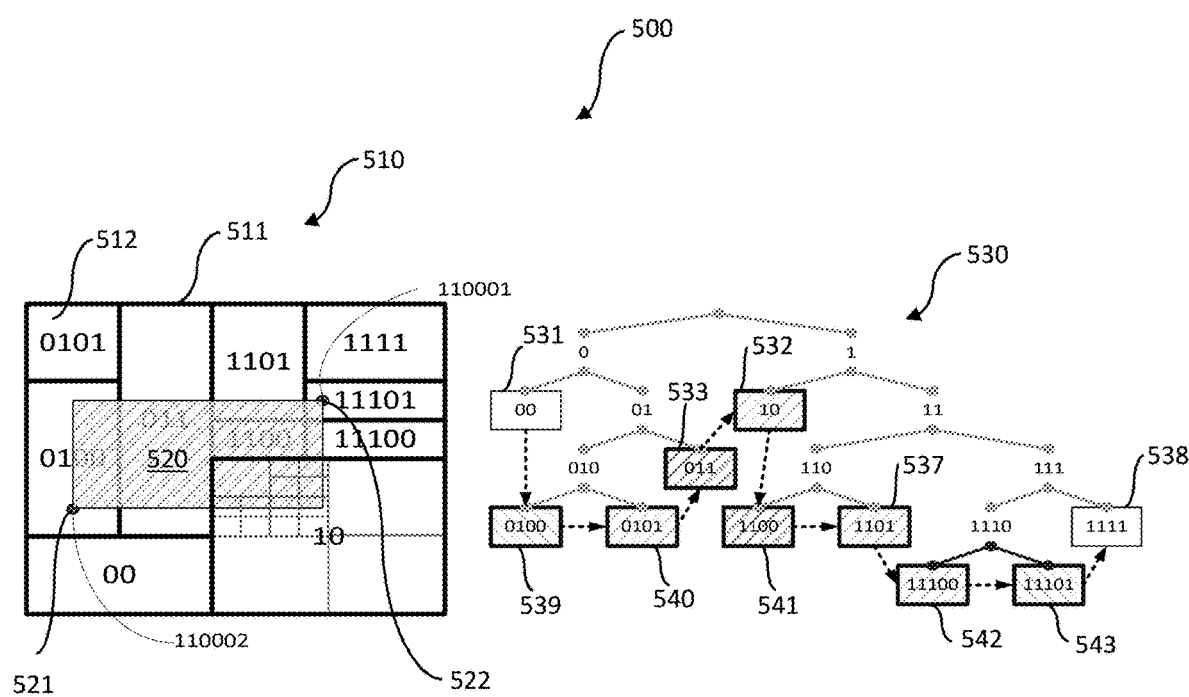
FIG. 5 is a diagram illustrating a process of finding and updating data points using the resolution net of the least differential sum (LDS) indexing method in accordance with an exemplary embodiment of the present invention.

Now, referring to FIG. 5, a data retrieval process 500 applying method 100 is shown. In one exemplary embodiment, matrix 510 labeled with binary addresses using binary decision tree 530 is presented. Memory blocks 512 are formed by the least differential sum (LDS) method 100 described above in FIG. 1-FIG. 3 sampled into an area 511. A query is entered by a user and translated into the database management language SQL or XML by a data flow engine. The query is defined by a first point 521 and a second point 522, which creates a rectangle area 520 on matrix 510. The upper right vertex of rectangular area 520 is point 522 which contains 110001. The lower left vertex 521 is 110002. Using resolution nets described above, points 521 and 522 have respective addresses of 11101 and 0100. Using binary decision tree 530 achieved by least differential method (LDS) method 100 described above, by traveling along the linked list starting from 0100 and ending at 11101, checking nodes by nodes, the memory blocs covered by queried rectangular area 520 are identified as: 00, 011, 0100, 0101, 10, 11100, 1101, 11100, 111101, and 1111. Those memory blocs that are completely covered such as 1100, all data points are necessarily retrieved. Those memory blocs that are completely outside rectangular area 520, no data points are retrieved. Next, using resolution nets to pinpoint data points in memory blocs that are partially intersected by rectangular area 520. Assuming memory block 10 is checked, the scan will be performed on the data grid from lowest resolution net 420 to highest resolution net 440. Therefore, the lowest or 2×2 resolution net 420 will be checked first. Of the cells, only cells (1, 0) assigned to the query should only check the data in this cell. Next, medium or 4×4 resolution net 430 is be scanned, since the cell (3,0) is in the query, so all data in this cell is retrieved. Meanwhile, cells (3, 1), (2, 0), and (2, 1) are only partially allocated, so the cells in the lowest or 8×8 resolution net 440 are checked. When examining the grid 8×8, because the cells (7, 0), (7, 1), (6, 0), and (6, 1) are in the grid (3, 0) of middle solution net 430, no further examination is necessary. The cells (7, 2) and (6,2) lie in span of the query, all data points in these cells are retrieved. As this is the final resolution net, all data points in the remaining cells are examined to find out which data points in the query will be included in the result set.

Figure 6:
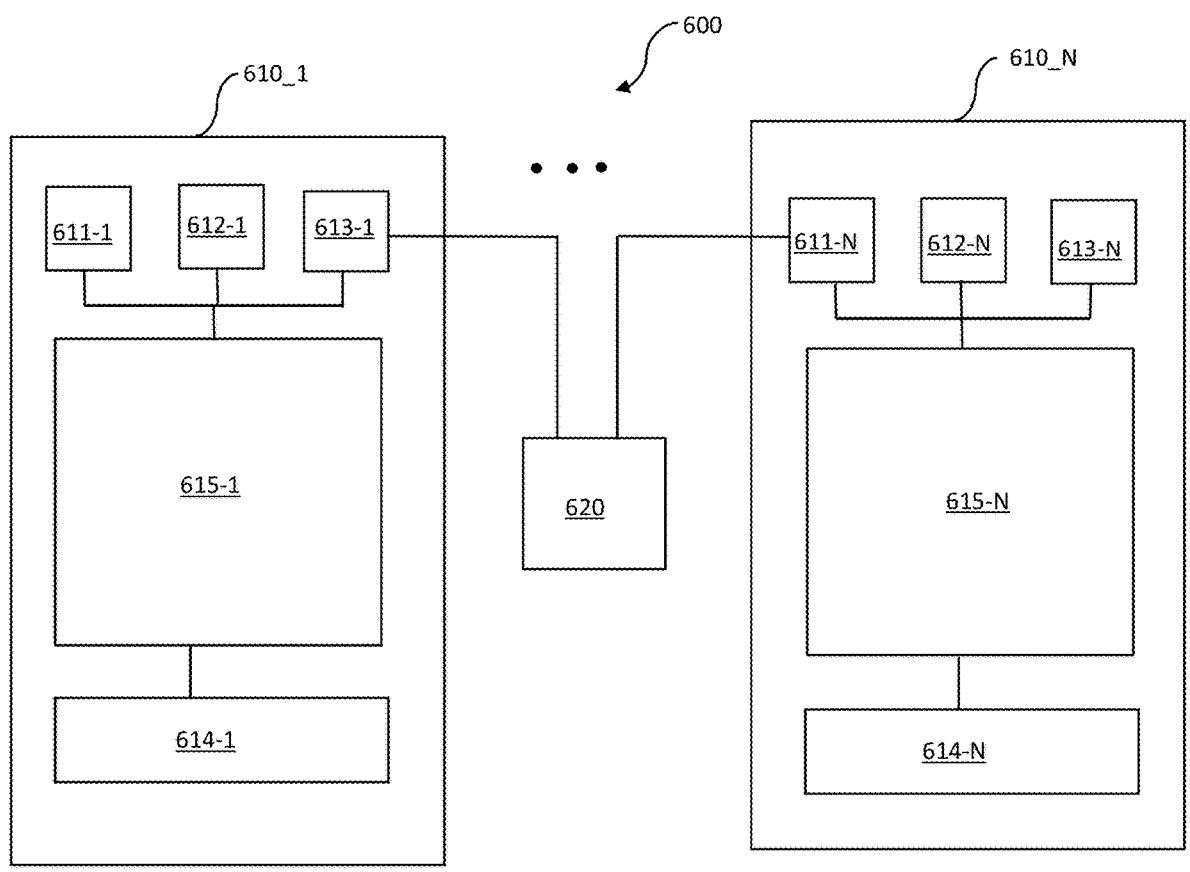
FIG. 6 is a schematic diagram of a computer network that has a distributed data space that method of FIG. 1 can be used as a database management system (DBMS) in accordance with an exemplary embodiment of the present invention.

Next referring to FIG. 6, a schematic diagram of a computer network 600 that has a distributed data space that method 100 described above can be used as a database management engine in accordance with an exemplary embodiment of the present invention is illustrated. Computer network 600 includes a plurality of computing devices 610-1 to 610-N, where N is a non-zero positive integer ($I^+$). Computing device 610-1 includes an input/output port 611-1, a central processing unit (CPU) 612-2, a network card 613-1, a storage device 615-1, and a display unit 614-1. Similarly, computing device 610-N includes an input/output port 611-N, a central processing unit (CPU) 612-N, a network card 613-N, a storage device 615-N, and a display unit 614-N. Computing devices 610-1 to 610N are connected together through a network 620. Method 100 described above and illustrating examples in FIG. 2 to FIG. 3(F) are used to manage the distributed data space in storage devices 615-1 to 615-N.

Thus, the present invention proposes a method and system for indexing spatial data used in computer network 600 which enables access, read, and update of aggregate spatial data space 615-1 to 615-N at high a speed and within the fastest time.

Figure 7:
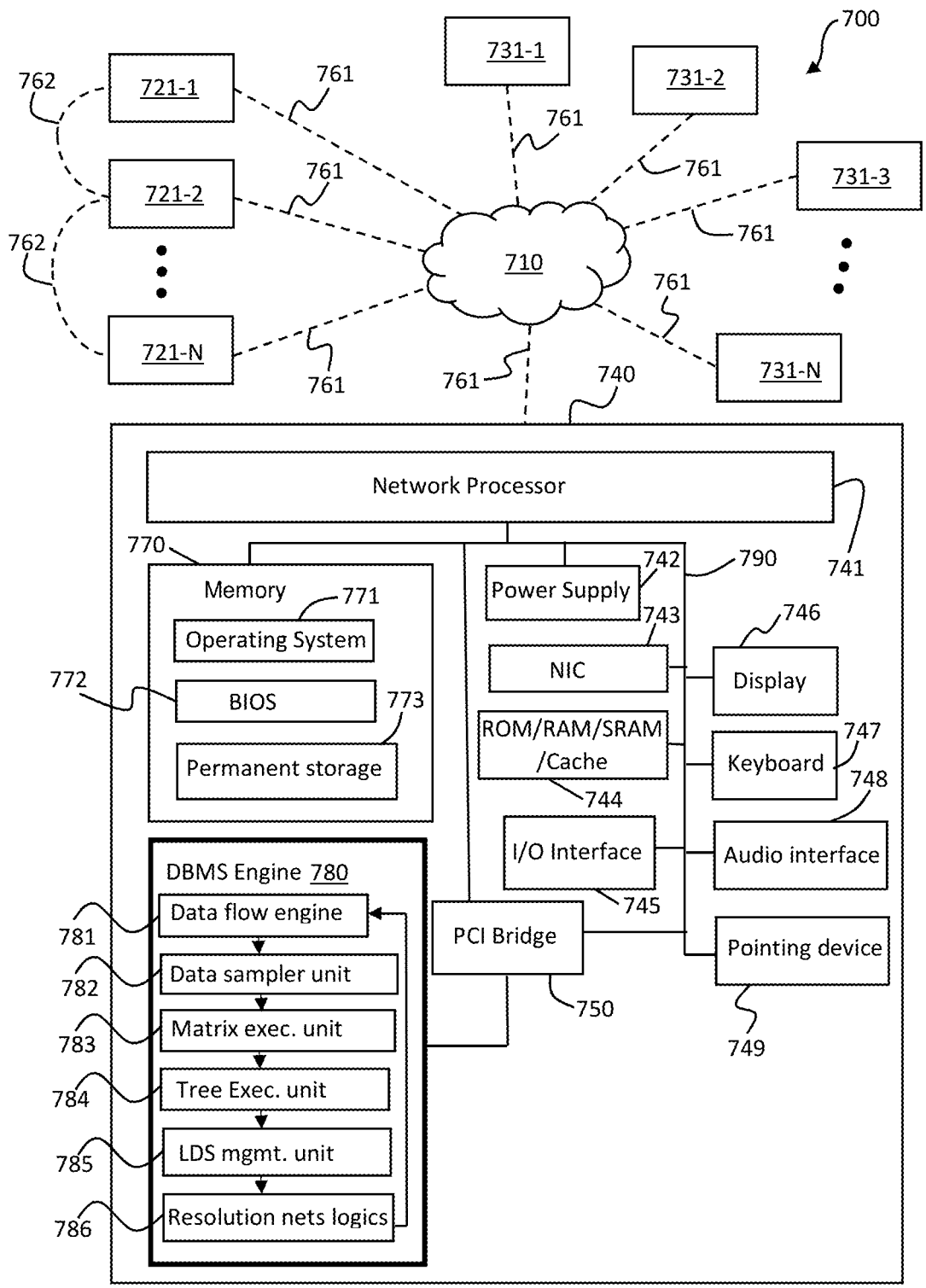
FIG. 7 is a schematic diagram of a network computer that includes a database management engine implementing the method of FIG. 1 in accordance with an exemplary embodiment of the present invention.

Finally, referring to FIG. 7, a schematic diagram of a network computer 700 that includes a hardware database management engine implementing the method 100 in accordance with an exemplary embodiment of the present invention is illustrated. Computer network 700 includes a first group of master-slave computers 721-1 to 721-N, a second group of computers 731-1 to 731-N, and a network computer 740, all are connected together and to a network 710 via communication channels 761. It will be appreciated that communication channel 761 may include, but not limited to, short range wireless communication channels, medium range wireless communication channels, and long range wireless communication channels. Wireless short range communication channels include ZigBee™/IEEE 802.15.4, Bluetooth™, Z-wave, NFC, Wi-Fi/802.11, cellular (e.g., GSM, GPRS, WCDMA, HSPA, and LTE, etc.), IEEE 802.15.4, IEEE 802.22, ISA100a, wireless USB, and Infrared (IR), etc. Medium range wireless communication channels in this embodiment of communication link 161 include Wi-Fi and Hotspot. Long range wireless communication channels include UHF/VHF radio frequencies.

First group of master-slave computers 721-1 to 721-N are connected together via a second communication channel 762 and set up so that computers 721-1 to 721-N are master-slave to one another. In an exemplary implementation of the present invention, second group of master-slave computers 721-1-721-N are connected together in different master-slave configurations via communication channel 761. It is noted that, non-limiting examples of communication channel 761 include short range wireless communication channels, medium range wireless communication channels, and long range wireless communication channels. Wireless short range communication channels include ZigBee™/IEEE 802.15.4, Bluetooth™ Z-wave, NFC, Wi-Fi/802.11, cellular (e.g., GSM, GPRS, WCDMA, HSPA, and LTE, etc.), IEEE 802.15.4, IEEE 802.22, ISA100a, wireless USB, and Infrared (IR), etc. Medium range wireless communication channels in this embodiment of communication link 161 include Wi-Fi and Hotspot. Long range wireless communication channels include UHF/VHF radio frequencies.

However they are connected together, all computers 721-1 to 721-N and 731-1 to 731-N have databases (not shown) connected via network 710. Together these databases form a distributed database, or database space. As shown in FIG. 7, server computer 740 includes a microprocessor 741 in communication with a memory 770 via a bus 790. Server computer 740 also includes a power supply 742, a network interface card (NIC) 743, a temporary memory such as ROM/RAM/Cache/SRAM 444, I/O interface 745. Server computer 740 also includes a display 746, a keyboard 747, an audio interface 748, pointing devices 749, and PCI (peripheral communication interface) 750. In one exemplary embodiment, power supply 742 provides power to the entire server computer 740. In another exemplary embodiment server computer 740 is a super computer. Yet in another embodiment, server computer 740 is a rack of blade servers.

Memory 770 may include Random Access Memory (RAM), Read-Only Memory (ROM), and/or other types of memory. Memory 770 illustrates an example of computer-readable storage media for storage of information such as computer-readable instructions, data structures, program modules or other data. Memory7 stores a basic input/output system (BIOS) 772 for controlling low-level operation of server computer 740. Memory 770 also stores an operating system (OS) 771 for controlling the operation of server computer 740. It will be appreciated that operating system 771 may include a general-purpose operating system such as a version of UNIX, or LINUX™, or a specialized operating system such as Microsoft Corporation's Windows® operating system, or the Apple Corporation's IOS® operating system. Operating system 771 may include, or interface with a Java virtual machine module that enables control of hardware components and/or operating system operations via Java application programs.

Data storage 773 may further include different types of data sets, which can be utilized by server computer 740 to store, among other things, log events and data/patterns. In many embodiments of the present invention, data/patterns storage 773 include, but not limited to, permanent storage such as optical memory (CD, DVD, HD-DVD, Blue-Ray Discs), semiconductor memory (e.g., RAM, EPROM, EEPROM), and/or magnetic memory (hard-disk drive, floppy-disk drive, tape drive, MRAM) among others.

Database management engine 780 may be hardware or software module. In one exemplary embodiment of the present invention, database management engine 780 is a hardware system which includes a data flow engine 781, a data sampler unit 782, a matrix execution unit 783, a tree execution unit 784, a least differential sum (LDS) management unit 785, and a resolution net logic unit 786. In various aspects of the present invention, data flow engine 781, data sampler unit 782, matrix execution circuitry 783, tree execution unit 784, least differential sum (LDS) management unit 785, and resolution net logic unit 786 are either combinatorial logic circuitry, or FPGA, or ASIC, or the combinations thereof. Data flow engine 781 uses either extensible mark-up language (XML) or structured query language (SQL) to manipulate, store, retrieve, and/or modify databases in 721-1 to 731-N and 731-1 to 731-N including permanent data storage 773 and cache/SRAM/ROM/RAM 744. Data sampler unit 782 samples all data points in the data space. In other words, data sampler unit 782 implements step 101 in FIG. 1 above. Matrix execution unit 783 creates a matrix for the data space, implementing step 102 above. Least differential sum (LDS) management unit 785 performs the equi-partition and summing up the data points in each cells as described in FIG. 1, which implements step 103. Tree execution unit 784, constructs the binary decision tree and assign binary address to each memory bloc as described in FIG. 3(E) and FIG. 3(F) which implements steps 104-107. Resolution net logic unit 786 performs the reading, writing, modifying of data points as described in FIG. 4 and FIG. 5. Then, the results will be transferred to data flow engine 781 to display to users.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS 210 spatial data space or geographical data space
211 a single data point
220 a data sample or a collection of data to be managed
230 N×M matrix covering the spatial data space
231 a cell of the N×M matrix
310 the sum N×M matrix where the number of data points are added in each cell
311-344 address of each cell in the N×M matrix
351 the vertical (columnar) partitioning line
352 the horizontal partitioning line
361 a first half after the first partition by the least differential sum (LDS)
362 a second half after the first partition by the LDS
361_1 first memory bloc after the second partition
361_2 second memory bloc after the second partition
362_1 third memory bloc after the second partition
362_2 fourth memory bloc after the second partition
361-1E a first leaf node in the binary resolution tree
361-2E a second leaf node in the binary resolution tree
362-1E a third leaf node in the binary resolution tree
362-2E a fourth leaf node in the binary resolution tree
361_1F first memory bloc with binary address from decision tree
361_2F second memory bloc with binary address from decision tree
362_1F third memory bloc with binary address from decision tree
362_2F fourth memory bloc with binary address from decision tree
401 a single cell in the resolution nets
410 data space
420 lowest resolution net or 2×2 resolution net
421 leaf nodes of the lowest resolution net
422 corresponding memory blocs of the lowest resolution net
430 medium resolution net or 4×4 resolution net
431 leaf node of the medium resolution net
432 corresponding memory blocs of the medium resolution net
440 highest resolution net or 8×8 resolution net
441 leaf node of the highest resolution net
442 corresponding memory blocs of the highest resolution net 413 a data point being stored in a leaf node
420 the highest density net
421 binary addresses of each memory space in the highest density net
422 memory space of the highest density net
430 the medium density net
431 binary addresses of each memory space in the medium density net
432 memory space of the medium density net
440 the lowest density net
441 binary addresses of the lowest density space
442 memory space of the lowest density space
450 the physical memory space
451 data point stored in the physical memory space
510 binary addressed matrix and the search query
511 binary addressed matrix
512 memory bloc
520 the rectangular area defining the scope of the search query
521 lowest left boundary of the search query
522 upper right boundary of the search query
530 The corresponding binary decision tree
531 Node 00 of the binary decision tree
532 Node 10 of the binary decision tree
533 Node 011 of the binary decision tree
538 Node 1111 of the binary decision tree
539 Node 0100 of the binary decision tree
540 Node 0101 of the binary decision tree
541 Node 1000 of the binary decision tree
542 Node 11100 of the binary decision tree
543 Node 11101 of the binary decision tree
600 a computer network that forms a distributed database
610_1 First computer
610_N $N^{th}$ computer
620 network
611_1 input/output port of the first computer
612_1 CPU of the first computer
613_1 NIC of the first computer
614-1 display unit of the first computer
611_N input/output port of the $N^{th}$ computer
612_N CPU of the $N^{th}$ computer
613_N NIC of the $N^{th}$ computer
614_N display unit of the $N^{th}$ computer
700 A computer network with distributed data space and DBMS of the present invention
710 network
721_1 First master-slave computer
721_N Nth master-slave computer
731_1 First independent computer
731_N Nth independent computer
740 Network computer having a DBMS of the present invention
741 Network processor
742 power supply
743 NIC
744 ROM/RAM/SRAM/Cache memory
745 Input/Output interface
746 display screen
747 keyboard
748 audio interface
749 pointing device
750 PCI bridge
461 communication link
770 memory
771 Operating System
772 BIOS
773 Permanent storage
780 DBMS engine
781 data flow engine
782 data sampler unit
783 matrix execution unit
784 tree execution unit
785 LDS management unit
786 resolution net logics unit
790 bus

What is claimed is:

1. A method for indexing a spatial data set in a database of a computer network comprising a data flow engine, a data sampler unit, a matrix execution unit, a tree execution unit, a least differential sum (LDS) management unit, a tree decision unit, and a net resolution management unit; the method comprising:
    (a) selecting a data sample of said spatial data set in said computer network using said data sampler unit;
    (b) dividing said data sample into an N×M matrix using said matrix execution unit; wherein said N×M matrix comprises a plurality of storage cells, and wherein N and M are non-zero positive integer numbers;
    (c) grouping said N×M matrix into a plurality of memory blocs according to a least differential sum (LDS) performed by said least differential sum (LDS) management unit;
    (d) constructing a decision tree based on said plurality of memory blocs using said tree decision unit;
    (e) assigning a specific address to each of said plurality of memory blocs based on branches of said decision tree;
    (f) storing and retrieving data points into said plurality of memory blocs; and
    (g) linking said memory blocs together by a set of resolution nets using said net resolution management unit.

2. The method according to claim 1 wherein each of said plurality of storage cells is a square storage cell of equal area wherein the size of each of said storage cell depends on a distribution of said spatial data set and wherein the area of said square storage cell depends on a standard deviation of said distribution so that each of said storage cell contains only one data point.

3. The method according to claim 1 wherein in said step (c) of grouping said N×M matrix into a plurality of memory blocs said least differential sum (LDS) method further comprises:
    providing a cell sum by adding up said data points in each cell of said N×M matrix; and
    recording said cell sum for each cell.

4. The method according to claim 3 wherein in said step (c) of grouping said N×M matrix into a plurality of memory blocs said least differential sum (LDS) method further comprises:
    partitioning said NxM matrix into either a horizontal half or a vertical half by either a horizontal line or a vertical line that yields a least differential sum between a minimal row differential sum and a minimal column differential sum, wherein said horizontal half comprises a first horizontal half and a second horizontal half and wherein said vertical half comprises a first vertical half and a second vertical half; and
    continuing partitioning each of said first horizontal half, said second horizontal half, said first vertical half, and said second vertical half until said N×M matrix cannot be further divided into said horizontal half and said vertical half.

5. The method according to claim 4, wherein in said step (c), said least differential sum (LDS) method is further comprises:
selecting a row in said N×M matrix and adding up said cell sums in said selected row and all rows either above or below said selected row into a first sum;
adding up said cell sums in remaining rows into a second sum;
subtracting said first sum from said second sum to find a row differential sum; and
moving to a next row and repeating the above steps until said minimal row differential is achieved;
selecting a column in said N×M matrix and adding up said cell sums in said selected column and all columns either to the left or to the right of said selected column into a third sum;
adding up said cell sums in remaining columns into a fourth sum;
subtracting said second sum from said third sum to find a column differential sum;
moving to a next column and repeating the above steps until said minimal column differential is achieved; and
comparing said row minimal differential and said column minimal differential to find said least differential sum.

6. The method according to claim 4, when N equals to M and both are positive even integer numbers, wherein in said step (c) of grouping said N×M matrix into a plurality of memory blocs according to said least differential sum method further comprises equipartitioning said N×M matrix into two equal areas which further comprises:
selecting a first horizontal half in said N×M matrix and adding up said cell sums in said first horizontal half into a first sum;
adding up said cell sums in remaining rows into a second sum; and
subtracting said first sum from said second sum to find a row differential sum;
selecting a first vertical half in said N×M matrix and adding up said cell sums in said first vertical half into a third sum;
adding up said cell sums in remaining columns into a fourth sum;
subtracting said second sum from said third sum to find a column differential sum; and
comparing said minimal differential and said column differential to find said least differential sum.

7. The method according to claim 1 wherein in said step (d) of constructing a decision tree based on said plurality of memory blocs, said decision tree unit is configured to divide said decision tree into a binary tree whose number of leaf nodes equals to a number of final horizontal halves and a final vertical halves which equal to the number of said memory blocs.

8. The method according to claim 7, wherein said step (d) of assigning a specific address to each of said plurality of memory blocs based on branches of said decision tree further comprises:
assigning a root node to the entirety of said N×M matrix;
assigning a "0" to a left child node and "1" to a right child node;
adding a "0" to a next generation left node until said leaf node is achieved; and
adding a "1" a next generation right node until said leaf node is achieved.

9. The method according to claim 8, further comprising assigning each of said plurality of memory blocs to each of said leaf nodes.

10. The method according to claim 9, wherein said resolution net logic unit places said set of resolution nets at said leaf nodes and further divides said set of resolution nets that comprises a I×J resolution net, a K×L resolution net, and a resolution R×S net, each comprising said plurality of storage cells having a row address and a column address, where I,J, K, L, R, S are non-zero positive integers, wherein R=S which is greater than K=L which is greater than I=J and wherein R×S net covers said K×L net which covers said I×J net.

11. A computer software program stored in a non-transitory computer readable medium for indexing and managing a database in a computer network comprising a data flow engine, a data sampler unit, a matrix execution unit, a tree execution unit, a least differential sum (LDS) management unit, a tree decision unit, and a net resolution management unit, comprising:
(a) selecting a data sample of said database;
(b) dividing said data sample into an N×M matrix comprising square storage cells, wherein N and M are non-zero positive integer numbers;
(c) grouping said N×M matrix into a plurality of memory blocs by a least differential sum (LDS) method;
(d) constructing a decision tree based on said memory blocs;
(e) labeling each of said plurality of memory blocs based on said decision tree;
(f) storing and retrieving data points into said plurality of memory blocs; and
(g) linking said plurality of memory blocs together by a set of resolution nets.

12. The computer software program according to claim 11 wherein said storage cell is a square cell of equal area wherein the size of each cell depends on a distribution of said spatial data set and wherein the area of said square storage cell depends on a standard deviation of said distribution so that each square storage cell contains only one data point.

13. The computer software program according to claim 11 wherein said step (b) of grouping said N×M matrix into a plurality of memory blocs by a least differential sum (LDS) method further comprises:
providing a cell sum by adding up said data points in each cell of said N×M matrix; and
recording said cell sum for each cell.

14. The computer software program according to claim 13 wherein step (b) of grouping said N×M matrix into a plurality of memory blocs by a least differential sum (LDS) method further comprises:
partitioning said N×M matrix into either a horizontal half or a vertical half by either a horizontal line or a vertical line that yields a least differential sum between a minimal row differential sum and a minimal column differential sum, wherein said horizontal half comprises a first horizontal half and a second horizontal half and wherein said vertical half comprises a first vertical half and a second vertical half; and
continuing partitioning each of said first horizontal half, said second horizontal half, said first vertical half, and said second vertical half until said N×M matrix cannot be further divided into said horizontal half and said vertical half.

15. The computer software program according to claim 14 wherein said least differential sum (LDS) further comprises:
selecting a row in said N×M matrix and adding up said cell sums in said selected row and all rows either above or below said selected row into a first sum;

adding up said cell sums in remaining rows into a second sum;

subtracting said first sum from said second sum to find a row differential sum; and moving to a next row and repeating the above steps until said minimal row differential is achieved;

selecting a column in said N×M matrix and adding up said cell sums in said selected column and all columns either to the left or to the right of said selected column into a third sum;

adding up said cell sums in remaining columns into a fourth sum;

subtracting said second sum from said third sum to find a column differential sum;

moving to a next column and repeating the above steps until said minimal column differential is achieved; and comparing said row minimal differential and said column minimal differential to find said least differential sum.

16. The computer software program according to claim 15 when N equals to M and both are positive even integer numbers, said grouping said N×M matrix into a plurality of memory blocs by said least differential sum method (LDS) further comprises equipartitioning said N×M matrix into two equal areas which further comprises:

selecting a first horizontal half in said N×M matrix and adding up said cell sums in said first horizontal half into a first sum;

adding up said cell sums in remaining rows into a second sum; and subtracting said first sum from said second sum to find a row differential sum;

selecting a first vertical half in said N×M matrix and adding up said cell sums in said first vertical half into a third sum;

adding up said cell sums in remaining columns into a fourth sum;

subtracting said second sum from said third sum to find a column differential sum; and comparing said minimal differential and said column differential to find said least differential sum.

17. The computer software program according to claim 16, wherein said step (e) of labeling each of said plurality of memory blocs based on said decision tree further comprises:

assigning a root node to the entirety of said N×M matrix;

assigning a "0" to a left child node and "1" to a right child node;

adding a "0" to a next generation left node until said leaf node is achieved; and adding a "1" a next generation right node until said leaf node is achieved.

18. The computer software program according to claim 17, further comprising assigning each of said plurality of memory blocs to each of said leaf nodes.

19. The method according to claim 18, wherein said resolution net logic unit places said set of resolution nets at said leaf nodes and further divides said set of resolution nets that comprises a I×J resolution net, a K×L resolution net, and a resolution R×S net, each comprising a plurality of cells having a row address and a column address, where I, J, K, L, R, S are non-zero positive integers, wherein R=S which is greater than K=L which is greater than I=J and wherein R×S net covers said K×L net which covers said I×J net.

20. A computer network, comprising:

a plurality of computing devices each comprising a non-transitory data storage, a microprocessor, an input/output system, and a display unit;

a network operable to facilitate the communication between said plurality of computing devices, wherein said network is operable to link said non-transitory data storages together into an aggregate spatial data space;

a database management system (DBMS) for managing said aggregate spatial data space, comprising:

a data flow engine, a data sampler unit, a matrix execution unit, a tree execution unit, a least differential sum (LDS) management unit, a tree decision unit, and a net resolution management unit;

a microprocessor operable to execute computer program instructions; and a memory space operable to store said computer program instructions executable by said microprocessor to perform the steps of:

(a) selecting a data sample of said spatial data set in said computer network using said data sampler unit;

(b) dividing said data sample into an N×M matrix using said matrix execution unit;

wherein said N×M matrix comprises a plurality of storage cells, and wherein N and M are non-zero positive integer numbers;

(c) grouping said N×M matrix into a plurality of memory blocs according to a least differential sum (LDS) performed by said least differential sum (LDS) management unit;

(d) constructing a decision tree based on said plurality of memory blocs using said tree decision unit;

(e) assigning a specific address to each of said plurality of memory blocs based on branches of said decision tree;

(f) storing and retrieving data points into said plurality of memory blocs; and (g) linking said memory blocs together by a set of resolution nets using said net resolution management unit.

* * * * *